United States Patent

[11] 3,622,430

| [72] | Inventor | Peter L. Jurisich<br>5225 Bindewald Drive, Torrance, Calif. 90505 |
|---|---|---|
| [21] | Appl. No. | 879,273 |
| [22] | Filed | Nov. 24, 1969 |
| [45] | Patented | Nov. 23, 1971 |

[54] DIMPLED SHEET STRUCTURAL LAMINATE
8 Claims, 2 Drawing Figs.

[52] U.S. Cl.............................................. 161/68,
 52/615, 52/618, 161/127, 161/131, 161/196
[51] Int. Cl.............................................. B32b 3/12
[50] Field of Search.......................... 52/615,
 618; 29/191.4, 45; 161/68, 69, 125, 127, 135, 139,
 161, 190, 131, 196; 181/33; 273/6

[56] References Cited
UNITED STATES PATENTS

| 2,985,968 | 5/1961 | Koch | 35/1 |
| 3,070,480 | 12/1962 | Breiner | 161/68 |
| 3,104,194 | 9/1963 | Zahorski | 161/68 X |
| 3,150,030 | 9/1964 | Mondano | 161/68 |
| 3,196,975 | 7/1965 | Voelker | 161/190 X |
| 3,301,732 | 1/1967 | Kunz | 161/36 X |

*Primary Examiner*—Harold Ansher
*Assistant Examiner*—Henry F. Epstein
*Attorney*—George F. Bethel ABSTRACT: A structural laminate comprising two outer and one inner reinforced resin sheets having major surfaces in overlying relationship, wherein one of said outer sheets and said inner sheet sandwiches a honeycomb or cellular core structure with said inner sheet also serving to sandwich a dimpled or relieved sheet with the other outer sheet.

PATENTED NOV 23 1971          3,622,430

INVENTOR.
PETER L. JURISICH
BY George L. Bethel

DIMPLED SHEET STRUCTURAL LAMINATE

BACKGROUND OF THE INVENTION

1. This invention lies within the art of reinforced structural composites.

2. It is known in the art to sandwich a honeycomb or cellular material between two major sheets of fibrous reinforced resin. Specifically, at least one sheet of fiberglass reinforced resin is adhered to a core material on either side thereof to form a sandwich structure with improved structural properties provided to both the core and sheets.

The core material has generally comprised a honeycomb structure having honeycomb-shaped cells with walls placed in an upright position in relation to the major surfaces of the sheets. The core material can be formed from a polystyrene foam, or a honeycomb-walled structure having walls composed of thin metal or reinforced fibrous material such as resin soaked cardboard.

The resin sheets forming the sides of the structural laminate are exposed to static loading stresses as well as impacts. The impacts in many cases have damaged the integrity of the structure by damaging the bond between the glass fiber resin sheet and the core material, as well as degrading the general strength of the core material. As can be appreciated, when the core material is degraded, the strength of the entire laminate is substantially decreased. Honeycomb laminates of the prior art depend upon the core material maintaining a rigid bracing between the outer glass fiber resin sheets in a continuous manner providing the strength thereof against bending moments.

A disassociated drawback of the prior art has been when fixtures have been attached to a honeycomb cored laminate. When attaching fixtures to such laminates, it is customary to bore a hole through the outer sheet into the honeycomb core and thereby damage the interior thereof. The degradation of the damaged honeycomb cored interior and the panel in general, has been such that the panel has lost a substantial portion of its strength when fixtures have been affixed thereto. The instant invention overcomes the degradation of such panels by allowing a fixture to be attached extrinsic to the interior of the honeycomb core.

The strength of a honeycomb core structural laminate is usually increased by strengthening the glass fiber sheets on either side of the core, or the core itself with an attendant increase in weight. This serves to decrease the normal strength to weight ratio attendant with honeycomb panels. The instant invention helps to overcome the foregoing strength to weight ratio problem and provides strengthening by means of an internal structure oriented in a different structural reference from the honeycomb core.

Prior art laminates have not provided a vapor barrier of sufficient strength to qualify them in many instances for use in those areas requiring a vapor barrier. The instant invention incorporates a metallic structure within the panel which limits the vapor transmissibility of the overall laminate.

In addition to the metallic structure of this invention providing a vapor barrier, it also provides a radio frequency shielding. Prior art panels did not provide such shielding so that they could not be used in lightweight radio frequency shielded structures.

When honeycomb reinforced panels are utilized for cargo containers, they are subject to great impact abuse and rodent attack. The instant invention helps to preclude rodent attack as well as limit the effects of impact abuse.

Thus, the instant invention helps to substantially overcome many of the deficiencies of the prior art as well as adding new features which were not available.

SUMMARY OF THE INVENTION

This invention provides a panel having a honeycomb core adhered to a glass fiber reinforced resin sheet on at least one major surface of the core. The reinforced glass fiber sheet in combination with a separate sheet sandwiches a dimpled or relieved metallic sheet adhered therebetween.

The foregoing structure serves to increase the strength to weight ratio of a honeycomb-cored laminate as well as providing increased strength in other structural dimensions above that which is normally obtainable in such laminates.

The panel of this invention also limits degradation of its strength when stresses or blows are incurred on the surface of the panel. Additionally, the invention allows fixtures to be attached to the panel without degrading the structural integrity thereof.

Furthermore, this invention provides radio frequency shielding, a vapor barrier, and resistance against rodent attack.

DESCRIPTION OF THE PREFERRED EMBODIMENTS

Figure 1:
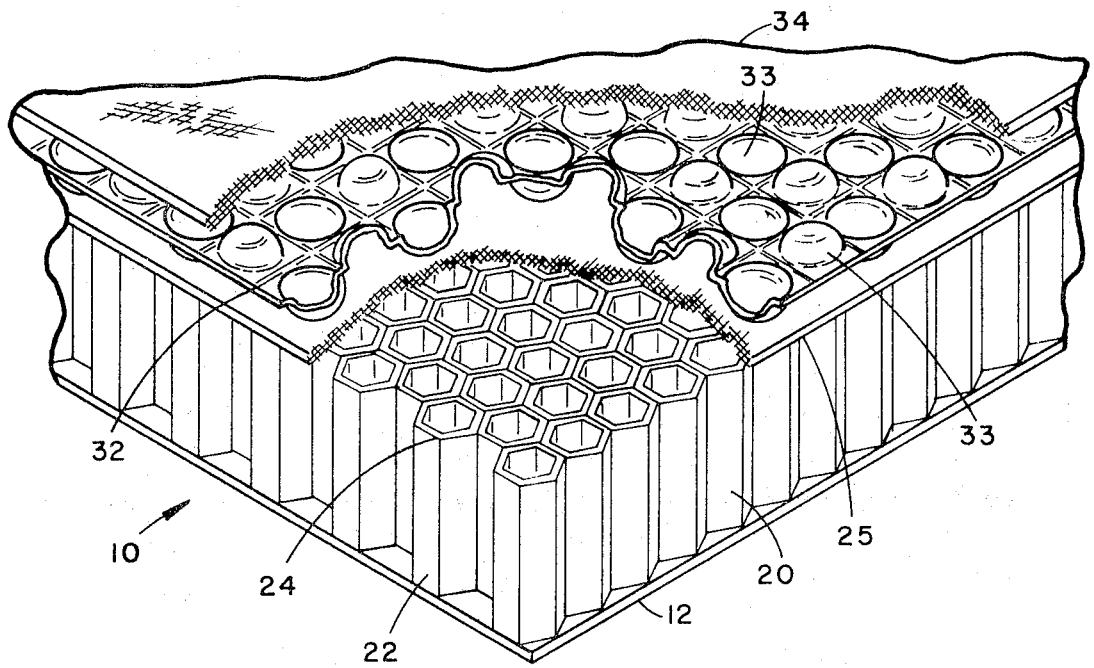
FIG. 1 shows a fragmented perspective view of this invention with the layers thereof in fragmented broken-away form to reveal the interior; and, FIG. 2 is a fragmented cross-sectional view of the panel of this invention.
Figure 2:
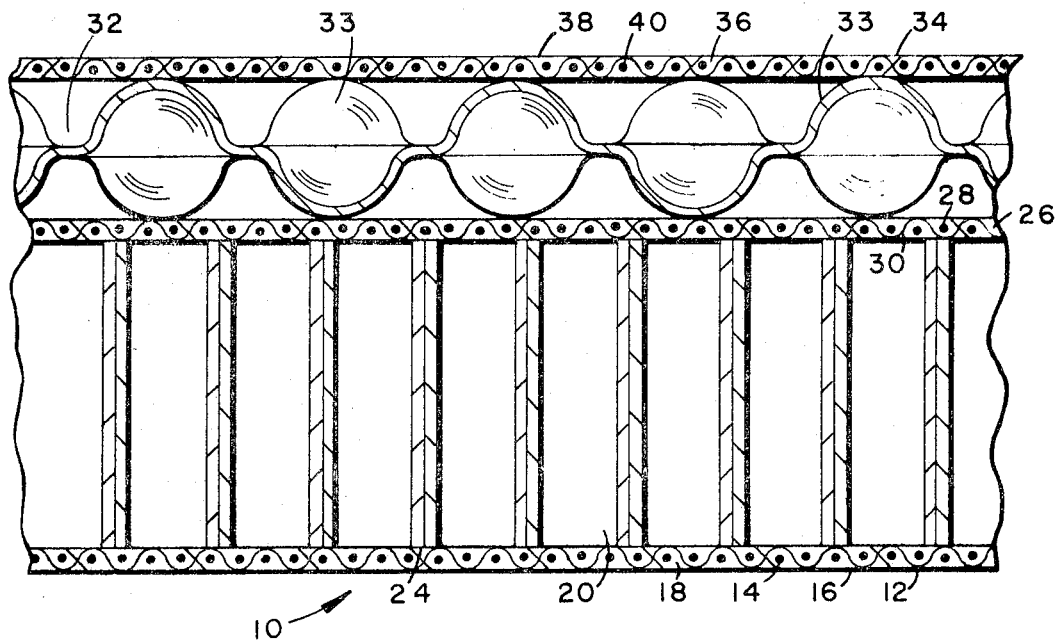

Looking more specifically at the drawings, a panel 10 is generally shown in fragmented form. The panel comprises a first sheet of glass fiber reinforced resin 12. The first sheet of fiberglass reinforced resin 12 is made by laminating a resin and glass fiber fabric into a thin sheet. As can be seen from the drawing, the fabric is woven with fill threads 14 and warp threads 16, with a resin filler 18 therebetween. It is not necessary that the sheet be formed with a woven fabric, but can be formed utilizing any sheetlike layer of glass fiber strands, or other reinforcing fibers.

The glass fiber sheet 12 is adhered to a honeycomb structure 20 which can be formed from thin cardboard, metal, or other suitable material. The honeycomb structure 20 is shown formed from a plurality of hexagonally shaped walls 22. The hexagonally shaped walls can be formed into unitary coterminal sidewalls in adjacent relationship to each other, to form a continuous walled series of hexagonally shaped structures.

The honeycomb core 20 may be adhered to the glass fiber sheet 12 in any suitable manner, and is usually adhered by a resin adhesive. The resin adhesive may be applied directly between the honeycomb core 20 and the sheet 12 after the sheet is cured, or may be provided by uncured resin of the sheet flowed onto the honeycomb core and cured during a laminating operation.

On the second major face of the honeycomb core 20 is a glass fiber reinforced resin sheet 25 similar to the first sheet. The glass fiber reinforced resin sheet 25 incorporates a filling resin 26 with fill threads 28 and warp threads 30. The reinforcing fiber of the glass fiber sheet may be in any suitable form and does not have to be the woven fabric as shown. Additionally, the sheet may be reinforced with other fibers such as mineral or metallic fibers.

Adhered to the second fiberglass resin sheet 25 is a dimpled or relieved thin metallic sheet 32. The dimpled or metallic sheet 32 is shown in the form of a sheet having a plurality of hemispherical dimples 33 on either side of it. The dimples 33 may be of any suitable shape, and not necessarily of the hemispherical type shown. Additionally, the sheet 32 may be provided with striations, or other relief such that the metal material of the sheet is removed from the neutral axis thereof. Such relief may be in the form of corrugations, flutes, diamond-shaped depressions, or any other geometrical depression, and/or raised portions. The object of the sheet is to provide a continuous sheet which is relieved to increase the shear and other dimensional strengths of the laminate and provide a cushioning stress member capable of absorbing impact.

Adhered to the exposed surface of the relieved sheet 32 is a third glass fiber reinforced resin sheet 34. The glass fiber reinforced resin sheet is comprised of filling resin 36 with warp threads 38 and fill threads 40 woven into a fabric. It should be understood that the fabric or glass fiber is not necessary for the practice of this invention as long as the sheet 34 is of suitable strength to provide a strong enough laminate and a protective skin.

The finished structural laminate 10 is generally installed by any suitable fasteners, or may be adhered by adhesive holding the structure in a usable configuration. Regardless of how the structural laminate 10 is assembled, the surface having the relieved portion thereunder should be adjacent the area of impact and loading stresses. The placement of the sheet 34 having the underlying relieved or waffle portion effectively creates an area which can absorb the stresses of impact without damage to the underlying core and sheet 25.

When fasteners or fixtures are attached to the reinforced structure, they are imbedded into the relieved sheet 32 so that they do not go into the core material 20. This manner of attachment helps to prevent any degradation of the structural laminate 10. The fasteners can be imbedded into a hole which as been provided in the relieved sheet 32 which does not affect the interior core 20 and interface therewith of the resin sheet 25.

It is to be understood that the above described arrangements are simply illustrative of the application of the principles of this invention. Numerous other arrangements may be readily devised incorporating different metallic as well as other types of relieved sheets 32 by those skilled in the art. Furthermore, the core 20 may be made from a foamed structure such as expanded polyurethane; all of the foregoing which will embody the principles of this invention and fall within the scope and spirit thereof.

I claim:
1. A structural laminate comprising:
    a core material having open cellular portions on a major face thereof;
    a resinous sheet adhered to a major face of said core material;
    a second resinous sheet overlying said first resinous sheet;
    a relieved sheet adhesively sandwiched between said first and second resinous sheets having portions thereof angularly displaced from the surface configuration between said first and second resinous sheets.
2. A structural laminate as claimed in claim 1 wherein:
    said core material comprises a cellular foam.
3. A structural laminate as claimed in claim 1 wherein:
    said core material comprises a plurality of coterminal walls forming a plurality of passages extending between one major face thereof to the other.
4. A structural laminate as claimed in claim 1 wherein:
    said resinous sheets are reinforced with an inorganic fiber.
5. A structural laminate as claimed in claim 4 further comprising:
    a reinforced resinous sheet adhered on the open side of said core material to provide a sandwiching of said core material on either side thereof.
6. A structural laminate as claimed in claim 5 wherein:
    said reinforced resin sheets comprise a glass fiber which has been impregnated with resin and cured.
7. A structural laminate as claimed in claim 1 wherein:
    said relieved sheet is of metal and relieved with a plurality of matched embossments on either face thereof.
8. A structural laminate as claimed in claim 1 wherein:
    said relieved sheet is of metal and formed with a plurality of elongated corrugations.

* * * * *